United States Patent

Maierson et al.

[15] 3,703,254

[45] Nov. 21, 1972

[54] PRE-FLUXED SOLDER POWDER

[72] Inventors: Theodore Maierson, Dayton; Harry L. Roe, Jr., Centerville; James E. Williams, Kettering, all of Ohio

[73] Assignee: The National Cash Register Company, Dayton, Ohio

[22] Filed: May 7, 1970

[21] Appl. No.: 35,414

[52] U.S. Cl. .................. 228/56, 29/192, 29/496, 148/24
[51] Int. Cl. .................. B23k 3/06, B23k 35/14
[58] Field of Search ........... 228/56, 41; 29/192, 496; 148/24; 117/100 M

[56] References Cited

UNITED STATES PATENTS

| | | | |
|---|---|---|---|
| 1,980,927 | 11/1934 | Parker | 228/56 |
| 2,334,609 | 11/1943 | Cox | 148/24 |
| 3,065,538 | 11/1962 | Melchurs et al. | 148/24 X |
| 3,418,179 | 12/1968 | Raynes et al. | 148/24 |
| 3,479,231 | 11/1969 | Joseph | 148/24 |
| 3,172,385 | 3/1965 | Varsane | 29/496 X |
| 3,471,310 | 10/1969 | Joseph et al. | 117/100 M X |

FOREIGN PATENTS OR APPLICATIONS

| | | | |
|---|---|---|---|
| 1,400,106 | 4/1965 | France | 228/56 |

*Primary Examiner*—J. Spencer Overholser
*Assistant Examiner*—Ronald J. Shore
*Attorney*—E. Frank McKinney and Robert J. Shafer

[57] ABSTRACT

A solder powder is disclosed comprising minute particles of metallic alloy solder coated by a thin layer of rosin soldering flux such that the flux performs a triple function of: (a) insulating the individual alloy solder particles from electrical conductance; (b) adhesively holding individual particles of solder in place by virtue of the sticky characteristics of the preferred fluxes used to coat the solder powder; and (c) providing, when melted, an agent to clean substrates and workpieces to be joined by soldering.

6 Claims, 7 Drawing Figures

PATENTED NOV 21 1972 3,703,254

INVENTORS
THEODORE MAIERSON
HARRY L. ROE, JR. &
JAMES E. WILLIAMS

PRE-FLUXED SOLDER POWDER

BACKGROUND OF THE INVENTION

1. Field of the Invention

The present invention pertains to a prefluxed solder powder composition wherein finely divided particles of solder alloy are individually coated by a thin coating of dielectric or electrically non-conducting fluxing material. The present invention also relates to a process for effecting soldered joints between metallic workpieces wherein free-flowing, fluxed-coated solder powder is positioned between workpieces to be joined either by being adhered to one of the workpieces or by being sprinkled into a space associated with workpiece surfaces. The present invention more particularly pertains to a prefluxed solder powder or fluxing solder alloy for use in fine soldering and soft metal brazing both in large-area, massive joints and for performing soldering and brazing operations in hard-to-reach places and in repetitive, mass production, conditions. A preferred composition of the present invention comprises particles of solder of an alloy of lead and tin in low-melting proportions and in size from about five to about five hundred microns in average diameter.

2. Description of the Prior Art

U.S. Pat. No. 3,172,385, issued Mar. 9, 1965 on the application of Robert G. Varsane relates to flux-coated "preforms" of large solder masses useful in soldering metallic bodies together. The preforms of that patent are disclosed to have a length of about one-half inch and are said to comprise a sandwich type of construction wherein a metallic workpiece to be soldered is coated by successive, continuous, layers of solder and flux. The size and shape of the preforms disclosed to be manufactured in the above-named patent are, by their very nature, limiting features with regard to the variety of soldering operations or applications which can be performed without first modifying the shape or size of the preform itself.

U.S. Pat. No. 3,389,116, issued June 18, 1968 on the application of Arthur W. Saha discloses that minute metallic particles or pigments can be coated with dielectric or insulating polymeric material in order to permit electrostatic spraying of paints which include those metal particles or pigment as a portion of the coloring or tinting element therein. Such disclosure may be considered to be pertinent with reference to the present invention only in that an insulating layer is provided on metallic particles. There is nothing disclosed with regard to meltable particle coatings, nor is it disclosed that the metals coated can be used as soldering or brazing alloys.

SUMMARY OF THE INVENTION

Heretofore, particularly to simplify soldering operations wherein the metal pieces to be soldered together were small or otherwise difficult to handle, bodies of a combination of solder and flux have been used to increase efficiency of the operation. Such bodies have been, characteristically, rather large compared to the area of the joint to be soldered. Such large flux-metal pieces must be pre-manufactured and different pieces must be made for each different job in mass production or assembly-line fabrication.

In some instances, it has been found to be required or desired to perform soldering operations in blind or hidden areas impossible to reach with conventional soldering equipment;—such being a difficult task prior to the present invention.

Also, in the manufacture of tiny electrical components, conductive metallic pieces must be joined by means of tiny conductive leads which must be soldered cleanly with a minimum of solder overflow and with a minimum of residual flux and solder contamination at the joint. A critical aspect of the above-mentioned difficulties resides in providing correct amounts of flux and solder, in the correct ratio, at the correct location, without the need to critical heating and cooling steps in completing the soldering operation.

As is well understood in the art of soldering metallic bodies, various solder compounds may be used depending upon the nature of the metals being soldered and depending upon the nature of the bond desired. The word "solder" as used in the present disclosure, includes various types of solders comprising soft solders and low-temperature brazing materials. Preferred for use in the present invention are soft solders which are relatively low-melting alloys of lead, tin, and copper and may include antimony, silver, arsenic and bismuth, if desired or required to impart special properties. Special solders including other metals may be used in practice of the present invention where electrical or other, more specific, characteristics are required in the soldered bond. Previously and conventionally, soft solders were provided commercially in the form of wire or ingots and sometimes as powders. Wire solders are sometimes provided with a flux core.

In soldering operations, materials named "flux" are utilized as an aid to the accomplishment of a successful metallic joint. Flux materials promote the fusion of the solder and aid in cleaning the metal surfaces to be soldered. Fluxes also eliminate or prevent the formation of contaminating metallic oxides during the soldering operation. Fluxes are commonly and preferredly melted at the intended joint just previous to melting the solder so that the flux can perform its functions immediately prior to contact of the workpiece edges by melted solder in completion of the joint. The use of flux during a soldering operation has, in the past, presented a considerable difficulty because the flux is generally commercially available in the form of paste, jelly, liquid or solid which is difficult to handle and to apply, particularly in correct amounts to inaccessible places with respect to delicate soldering operations. Fluxes available for use in the present invention include those materials which can be formed into a continuous, insulating, coating about individual, finely divided, solder particles. Preferred for use in the present invention are acid-type organic polymeric fluxes such as rosin and rosin-alcohol in its pure water-white form. These materials provide excellent results, apparently because of their properties as a natural gum. The various types of preferred rosin include gum rosin, wood rosin, and tall oil rosin, all resin acids chiefly of the abietic and pimaric types. Being natural gums, the rosins preferred in the present invention have adhesive properties whereby they can bond firmly to the solder particles and, in turn, form strong adhesive bonds between the solder particles and any other workpiece substrate.

It should, however, be pointed out that flux materials other than rosin may be used, provided that such materials have the appropriate adhesive or "waxy" properties or provided that they can be combined with other materials such as rosin or other finely divided tacky resinous binder material to obtain the adhesive properties. Thus, any flux is eligible for use, provided that it is a solid at room temperature, that it can be reduced to a finely divided powder form, and that it can be coated onto the individual solder particles as a continuous layer.

The individual, minute, particles of soldering material can be coated by any of several well known processes previously taught in the prior art. The individual particles can, for example, be coated by being suspended in a solution of flux material dissolved in an evaporable organic solvent. The suspension or dispersion of solder particles in that flux solution can then be cast in a drying pan or otherwise distributed, such as by spray-drying, in order to evaporate the solvent and leave a thin, continuous, layer of flux material surrounding each individual solder particle. The preferred method for coating the individual solder particles is according to, en masse, encapsulating procedures wherein liquid-liquid phase separation is conducted in a capsule manufacturing vehicle utilizing a phase-separation-inducing material or phase-separation-inducing conditions and wherein the soldering flux is present as capsule wall material. Examples of the preferred method for coating the individual solder particles will be set out below in order to provide complete disclosure of a method for practicing the subject invention.

As mentioned above, the alloys most commonly and preferredly used in practice of the present invention are so-called "soft solder" alloys and usually comprise tin and lead as major constituents. Also included as component materials in some of the soft solders eligible for use in practice of the present invention are rather minor amounts of metals such as antimony, silver and arsenic. The solders which can be used in the present invention are differentiated, in the main, by difference in melting point range and also by a difference in wetting capabilities as pertain to the various metallic workpieces to be joined. The most preferred solder alloy used in the present invention is a, so-called, eutectic solder which consists of about 38 percent, by weight, lead, 62 percent, by weight, tin, and has a melting point of about 183° centigrade. In practically all cases, no matter what solder alloy is used, the melting point for the solder will remain below a temperature of about 425° centigrade. An example of an eligible high temperature solder is an alloy containing about 97.5 percent, by weight, lead, 1.5 percent, by weight, silver, and 1 percent, by weight, tin;--that solder alloy having a melting point of approximately 210° centigrade. An example of an eligible intermediate-temperature solder is an alloy including about 66 percent, by weight, lead, 32 percent, by weight, tin, 2 percent by weight antimony, and 0.1 percent, by weight, arsenic;--such alloy having a melting range of from about 186° to 241° centigrade.

A general process for practicing the present invention using flux-coated solder particles includes the following steps:

a. contacting flux-coated solder powder with a metallic substrate to be soldered wherein the metallic substrate has a surface temperature above the melting point of the flux and below the melting point of the solder material;

b. cooling the metallic substrate to cause the flux-coated solder powder to adhere to the substrate by fusion and resolidification of the flux material;

c. contacting the metallic substrate to be soldered with a metallic workpiece to be joined thereto;

d. heating the contacting combination of metallic substrate and metallic workpiece to a temperature at least above the melting point of the solder alloy; and e. cooling the contacting combination of metallic pieces to set the solder and thereby create a soldered union of the pieces.

In the above-discussed process for practicing the present invention, the step of contacting flux-coated solder particles with the substrate to be soldered includes any of several methods such as by immersing the warmed substrate to be soldered in a bed of flux-coated particles, either fluidized or not, to dissipate heat from the substrate into the bed of particles. In the process of heat dissipation, flux from the particles will be melted and the particles will become adhered to the metallic substrate. Of course, the fluxing solder alloy powder can be sprinkled onto a cold substrate or workpiece which will eventually be soldered according to the process of the present invention and, in that case, the solder powder will not adhere to the workpiece. In that case, care must be exercised in maintaining an adequate amount of the flux-coated solder powder in the area of the intended solder joint. Another variation of the contacting steps in the process includes the instance wherein the solder powder might be sprayed onto a hot substrate and there be instantaneously adhered by virtue of the flux being melted and stuck thereto. It is also possible that a substrate can be coated by an adhesive material which operates to adhere flux-coated solder to the substrate and then cooling the substrate can also be reversed wherein the solder powder can be coated onto a substrate and then the substrate can be heated to melt the flux and cooled to solidify the flux and thereby adhere the solder particles.

Another process for utilizing the flux-coated solder of the present invention includes the following steps:

a. positioning flux-coated solder powder between substrates or workpieces to be joined;

b. heating the substrates or workpieces to melt the flux;

c. continuing the heating to melt the solder and create a liquid solder bridge between the workpieces; and d. cooling the assembly to complete the solder joint.

In the above-mentioned processes, the solder powder can be introduced between the substrates or workpieces to be joined by coating a metallic interleaf on both sides with the coated solder powder and then inserting the interleaf between metallic substrates to be joined and proceeding with the steps of the process, as outlined above. The interleaf can be any metal which melts at a temperature higher than the solder and can be coated in the same manner as is described above for coating substrates or workpieces.

Of the total weight of each individual flux-coated solder particle, 5 to 50 percent, by weight, should be flux material present as a continuous external coating and the remainder, that is, 95 to 50 percent, by weight, should be solder. The individual solder particles are minute in size and should range in size from about 10 to about 500 microns in average diameter. It has been found that solder particle sizes below about 10 microns in average diameter do not permit application of the proper amount of flux material to the individual particles.

It has also been found that fluxing solder alloy particles greater than about 500 microns in average diameter cannot properly adhere to the surface of a substrate to be soldered.

Solder particles of small size eligible for use in the present invention cannot be adequately covered by flux using the process of tumbling solder particles and flux particles together in a dry pan. It is apparently true that the mass of the individual solder particles is not great enough to permit deformation, adherence and consequent coating by tiny particles of powdered flux material.

BRIEF DESCRIPTION OF THE DRAWINGS

In FIG. 1, the flux coating 10 is shown to be continuous and substantially even over the entire surface of the solder particle 11 to yield the flux-coated solder particle 12 which, when used in a mass, is effective according to the process of the present invention. FIG. 2 schematically represents a plurality of flux-coated solder particles 12 covering one portion of a metallic workpiece 15 wherein the flux coating 10 surrounding each solder particle 11, has been fused with each adjacent coating 10 to yield a coherent whole. The flux-coated solder particle 12 is shown in FIGS. 3 and 4 as a coating, en masse, on metallic workpieces. In FIG. 3, the metallic part 13 is shown as being a small metallic workpiece and, when coated, represents a powder coated interleaf 14 useful as before-described. In FIG. 4, the flux coated solder particles 12 are shown to be covering one portion of one surface of a metallic workpiece 15. FIGS. 5 and 6 demonstrate, in a schematic representation, the manner in which elements from FIGS. 3 and 4 are utilized to practice the process of the invention. In FIG. 7, wire ends 16 are depicted only as one of a multitude of examples which could be employed to teach specific metallic workpieces eligible for use in the present invention. Of course in FIG. 7, the flux-coated solder powder 12 can be applied over the entire surface of pieces to be joined or can be provided on only a portion of the surfaces to be joined or can be present on the surface of only one of the two or more pieces to be joined. It should be noted that in all of the figures the workpieces, interleaves, and wire ends, are shown only as schematic representations to more adequately and clearly explain the invention and set out the concepts involved in practicing the invention and utilizing the coated solder powder. The drawings are not intended to limit the present invention and are to be viewed as disclosing the invention in concert with the examples and the remainder of the specification.

DESCRIPTION OF PREFERRED EMBODIMENTS

EXAMPLE 1

Figure 1:
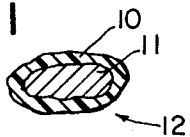
FIG. 1 schematically represents a cross-section of one, individual, flux-coated solder article of the present invention. Such article is usually referred to herein as a particle. The flux-coated articles are used in a mass; but a figure simply depicting a pile of the articles was deemed to have little instructive value and has been, therefore, omitted.
Figure 2:
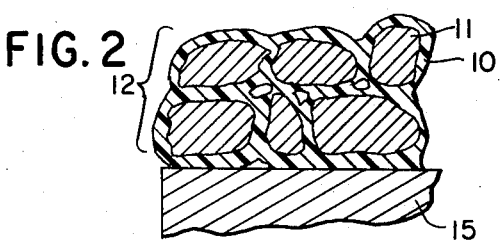
FIG. 2 is a schematic, cross-section, representation, in large-scale, of a workpiece coated by solder powder composition of the present invention.
Figure 3:
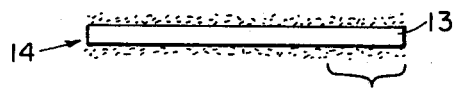
FIG. 3 represents a metallic part coated on two sides by the solder powder of the present invention.
Figure 4:
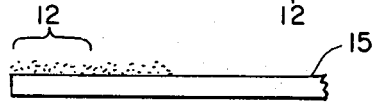
FIG. 4 represents a workpiece or substrate coated on one side by solder powder of the present invention.
Figure 5:
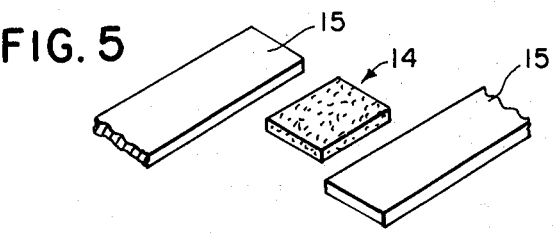
FIG. 5 is an exploded view, of two workpieces to be joined by an interleaf coated by flux-coated solder powder.
Figure 6:
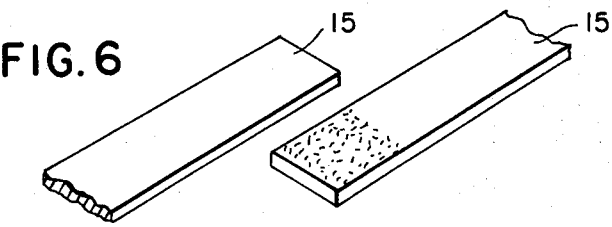
FIG. 6 is similar to FIG. 5 with the exception that the flux-coated solder powder has been applied directly to one or both of the workpieces and the interleaf has been omitted.
Figure 7:
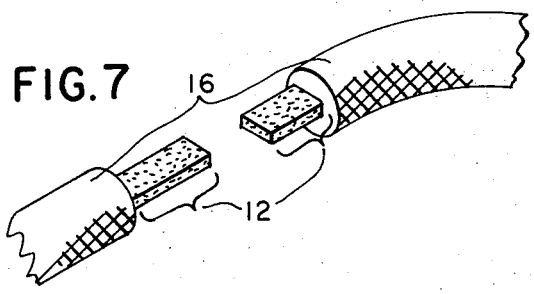
FIG. 7 is a schematic representation of two workpieces, for example, wire ends, which are to be joined according to the process of the present invention using the flux-coated solder powder.

In the present example finely divided particles of a eutectic solder comprising about 39 percent, by weight, lead and about 62 percent, by weight, tin were coated as individual particles using an acid rosin designated by the trademark "K wood" sold by Hercules Inc., Wilmington, Delaware, United States of America.

To prepare the coated solder powder composition, 8 grams of the rosin was dissolved in 392 grams of chloroform; such being selected to be an appropriate solvent for liquid-liquid phase separation of the rosin, which separation will be described hereinbelow. To the solution of rosin, was added 8 grams of the solder powder having an average particle size range of about 100 to about 250 microns, and the system was agitated to the extent required to maintain complete dispersion of the solder powder in the solution. To this dispersion, while maintaining agitation, was added, 4 milliliters of 1-hydroxyethyl-2-heptadecenyl glyoxalidine as surface active agent and rosin plasticizer and the system was heated to about 60° centigrade. About 200 grams of silicone fluid (polydimethylsiloxane having a molecular weight indicated by a viscosity of 50 centistokes and sold, for example, by Dow Corning Corporation, Midland, Michigan, U.S.A. under the trademark, "DC-200") were added to the system in a drop-by-drop manner to accomplish phase separation of the rosin. Agitation of the system was continued and the temperature was permitted to decrease to about 25°-30° centigrade at which time about 2.5 milliliters of tetrabutyl titanate was added as chemical hardening agent for the rosin coating material. Agitation was continued for about 3 hours and then about 500 milliliters of cyclohexane was added as a liquid rinse to a aid in separating coated solder particles from suspended solid residue. Agitation was stopped and the supernatant was decanted. The particles were so-rinsed twice again using 500 milliliter portions of cyclohexane and the particles were then dried to a free-flowing powder-like form.

It should be understood that the present invention is not considered to reside in the method for manufacturing coated solder particles but such has been disclosed to afford a more complete teaching.

In this example, the rosin-coated, free-flowing solder particles are charged into an air-fluidized bed and the metallic substrate is heated to about 100° centigrade.

The heated substrate is immersed into the fluidized bed, is cooled by operation of the bed and, in being cooled melts the rosin on some solder particles which particles are consequently adhered to the substrate. The now-solder-coated substrate is contacted with another metallic workpiece and the two pieces together are reheated;—this time to a temperature above the melting point of the solder. Those two pieces, including the melted solder between the pieces are then cooled to freeze or solidify the solder and complete the soldered joint. This example can also be conducted wherein the rosin-coated solder particles are heated, in a fluid bed, to above the rosin melting point and cool workpieces are contacted therewith. Agitation of the particles by being air-suspended, is necessary to prevent agglomeration.

EXAMPLE 2

In this example, the solder powder from Example 1 is coated onto an interleaf by heating the interleaf and immersing it into a tray containing the solder particles. That metallic interleaf is then positioned between two workpieces to be joined by soldering, the workpieces are heated, cooled, and excess flux is cleaned from the joint using an organic solvent such as acetone.

EXAMPLE 3

In this example, flux-coated solder particles are utilized in affixing metal pegs to a metallic board having blind holes of a size to receive the pegs. A portion of the solder particles are introduced into the holes, the pegs are then inserted, and heat is applied to the extent required to melt, first the flux, and then the solder. The surfaces of the hole and the plug are first fluxed and then soldered.

EXAMPLE 4

In this example flux-coated solder particles are applied to a substrate to be soldered by utilizing a commercially available aerosol liquid flux preparation as a temporary adhesive material for joining solder particles to a substrate.

Although such use of liquid flux introduces a risk of excess fluxing material, it avoids any inconveniences present in the fluid-bed application of Example 1, herein. A non-flux adhesive material can be utilized with only the adverse effect that the adhesive material might contaminate the soldered joint.

The liquid flux, as adhesive, can also be applied by methods other than by spraying. As an example, the flux can be printed onto a metallic substrate in conformations or designs such that solder, when applied, will adhere in particular, desired areas.

EXAMPLE 5

In this example, a layer of the flux-coated solder is sandwiched between perforated metallic circuit boards which are selectively activated when caused to be electrically joined at particular points. In the initial sandwich, the coated solder provides complete electrical insulation between the circuit boards by virtue of the non-conducting character of the flux material. Metallic pins or wire leads from another source are heated to a temperature above the melting point of the solder and are inserted into appropriate perforations in the sandwhich. Heat from the pin or wire melts the flux, then melts the solder, and provides electrical connection between both of the circuit boards and, in the case of a wire lead, the other source.

We claim:

1. An electrically non-conducting, powder, soldering composition consisting essentially of, in a free-flowing mass, a multitude of individual minute particles of solder alloy about 5 to 500 microns in average diameter, each covered by a thin, continuous, coating consisting essentially of a dielectric, organic, flux material having a melting temperature below the melting temperature of the solder alloy.

2. The composition of claim 1 wherein the flux material consists essentially of a rosin and is an electrical insulator, an adhesive to hold individual particles in place on a workpiece and, when melted, a cleaning agent for metallic substrates.

3. The composition of claim 1 wherein the flux material is present in an amount from about 5 to about 50 percent, by weight.

4. An article of fluxing solder alloy consisting essentially of a minute particle of metallic solder alloy about 5 to 500 microns in diameter and a continuous coating consisting essentially of organic flux material covering the particle and having a melting temperature below the melting point of the solder alloy.

5. The article of claim 4 wherein the flux material consists essentially of a rosin and is an electrical insulator, an adhesive to hold individual particles in place on a workpiece and, when melted, a cleaning agent for metallic substrates.

6. The article of claim 4 wherein the flux material is present in an amount from about 5 to about 50 percent, by weight.

* * * * *